United States Patent
Håkansson

(10) Patent No.: US 6,517,717 B1
(45) Date of Patent: Feb. 11, 2003

(54) LIQUID FILTER

(75) Inventor: Nils Olof Håkansson, Stenkullen (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/830,181

(22) PCT Filed: Oct. 22, 1999

(86) PCT No.: PCT/SE99/01907

§ 371 (c)(1), (2), (4) Date: Jul. 30, 2001

(87) PCT Pub. No.: WO00/24494

PCT Pub. Date: May 4, 2000

(30) Foreign Application Priority Data

Oct. 23, 1998 (SE) .................................. 9803645

(51) Int. Cl.$^7$ ............................................. B01D 35/34
(52) U.S. Cl. .................. 210/232; 210/440; 210/450; 210/484; 210/493.1
(58) Field of Search .................. 210/248, 440, 210/443, 444, 450, 455, 484, 493.1, 493.2, 457, 232

(56) References Cited

U.S. PATENT DOCUMENTS

| | | | | |
|---|---|---|---|---|
| 3,727,764 A | * | 4/1973 | Ogden ........................ 210/232 |
| 3,773,180 A | * | 11/1973 | Harrison ...................... 210/315 |
| 4,836,925 A | * | 6/1989 | Wolf ......................... 210/323.2 |
| 4,882,051 A | * | 11/1989 | Itoh ........................... 210/248 |
| 5,026,478 A | * | 6/1991 | Tanabe et al. ............... 210/232 |
| 5,256,285 A | * | 10/1993 | Tomita et al. ............... 210/234 |
| 5,277,807 A | * | 1/1994 | Lavoie et al. ................ 210/232 |
| 5,753,120 A | * | 5/1998 | Clausen et al. ............. 210/438 |
| 5,919,362 A | * | 7/1999 | Barnes et al. ............... 210/232 |
| 6,322,697 B1 | * | 11/2001 | Hacker et al. .............. 210/248 |

FOREIGN PATENT DOCUMENTS

| | | |
|---|---|---|
| DE | 32 35 514 | 11/1983 |
| DE | 32 33 523 | 3/1984 |
| EP | 0 117 222 | 8/1984 |

* cited by examiner

Primary Examiner—Matthew O. Savage
(74) Attorney, Agent, or Firm—Young & Thompson

(57) ABSTRACT

Oil or fuel filter includes a holder element with an inlet and an outlet for liquid, an outer container fixed to the holder element, and a filter insert housed in the outer container. The insert includes an inner container, a filter element and a perforated tube placed centrally in the filter element, all of these elements being glued to each other so that they form a replaceable filter unit with a collecting container for contaminants.

20 Claims, 2 Drawing Sheets

LIQUID FILTER

BACKGROUND OF THE INVENTION

The present invention relates to a liquid filter, comprising a holder element with an inlet and an outlet for liquid, a first container attachable to the holder element, and a filter body housed in said first container, said body being so dimensioned relative to said container, that an intermediate space is formed between the inside of said first container and the outside of said filter body, and is so arranged relative to said holder element that the inlet opens into said intermediate space, while a space inside the filter body opens into the outlet.

DESCRIPTION OF THE RELATED ART

Two main categories of oil or fuel filters of this type are commercially available. Both consist of an outer cylindrical container of rigid material, usually sheet metal, and a filter insert of a fibrous material, e.g. cardboard folded in the form of a cylinder about a perforated tube. In the first case, the perforated tube is a metal pipe solidly joined to the container and having a threaded portion projecting up out of the container and being screwed securely to a threaded outlet connection on the holder element. The container with the filter insert forms a filter unit, which is commonly known as a spin-on filter. Such filters are relatively expensive since the container as well must be replaced when the filter is replaced. For processing discarded filters, the combustible material must be separated from the metal portions. In the second case, the perforated tube is a plastic tube, solidly joined to the folded cardboard cylinder and being held together therewith loosely in the container. When the filter is replaced, only the filter insert is replaced in the container, which after insertion of the new filter insert is screwed back onto the holder element. Filter replacement will therefore be less expensive than when the container itself must be replaced. Since the entire insert consists of combustible material, waste handling will be less expensive. The disadvantage is, however, that dirty oil or fuel deposits and other contaminants remaining in the container require the container to be cleaned before putting in the new insert. The cleaning requires the use of solvents to be effective. Neglected cleaning will increase the risk of contaminants entering the oil or fuel system of the engine and disrupting operation or causing damage to the engine.

SUMMARY OF THE INVENTION

The purpose of the present invention is to achieve a liquid filter of the type described by way of introduction which reduces the costs of replacing the filter in comparison with the first mentioned category above, while eliminating at the same time the risk of residual contaminants entering the oil or fuel system of the engine.

This is achieved according to the invention by virtue of the fact that said filter body is securely joined to a second container arranged in the first container and having, between its interior side and the outside of the filter element, an intermediate space into which the holder element inlet opens.

The second container forms a sort of liner inside the first container, and the contaminants are collected in the liner and are removed together with the filter upon replacement. There is thus no need to clean the outer container, which is reused after mounting of the new filter insert. If the outer container is made of a rigid material, e.g. sheet metal, the inner container can be made of softer material. It can, with advantage, be made of relatively soft plastic, since the liquid pressure against the walls of the inner container will be taken up by the outer container. This means that only combustible materials will be discarded when the filter is replaced.

BRIEF DESCRIPTION OF THE DRAWINGS

The invention will be described in more detail below with reference to examples shown in the accompanying drawings, where.

DESCRIPTION OF THE PREFERRED EMBODIMENTS

Figure 1:
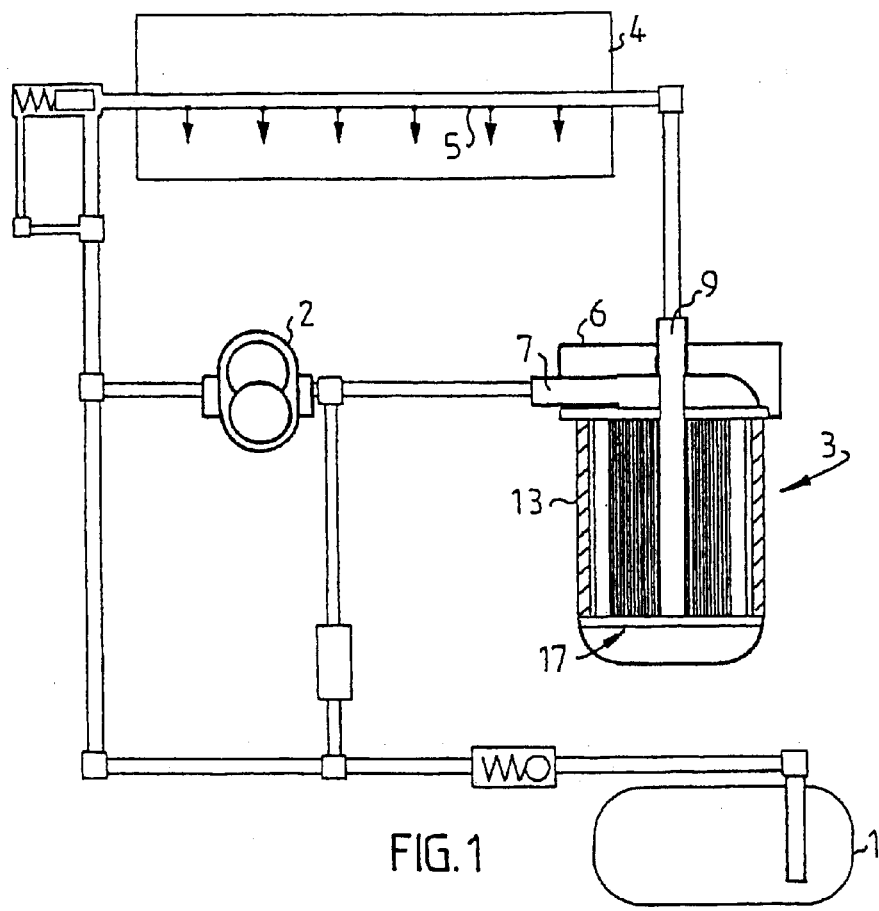
FIG. 1 shows a simplified, schematic drawing of a fuel system of an internal combustion engine.
Figure 2:
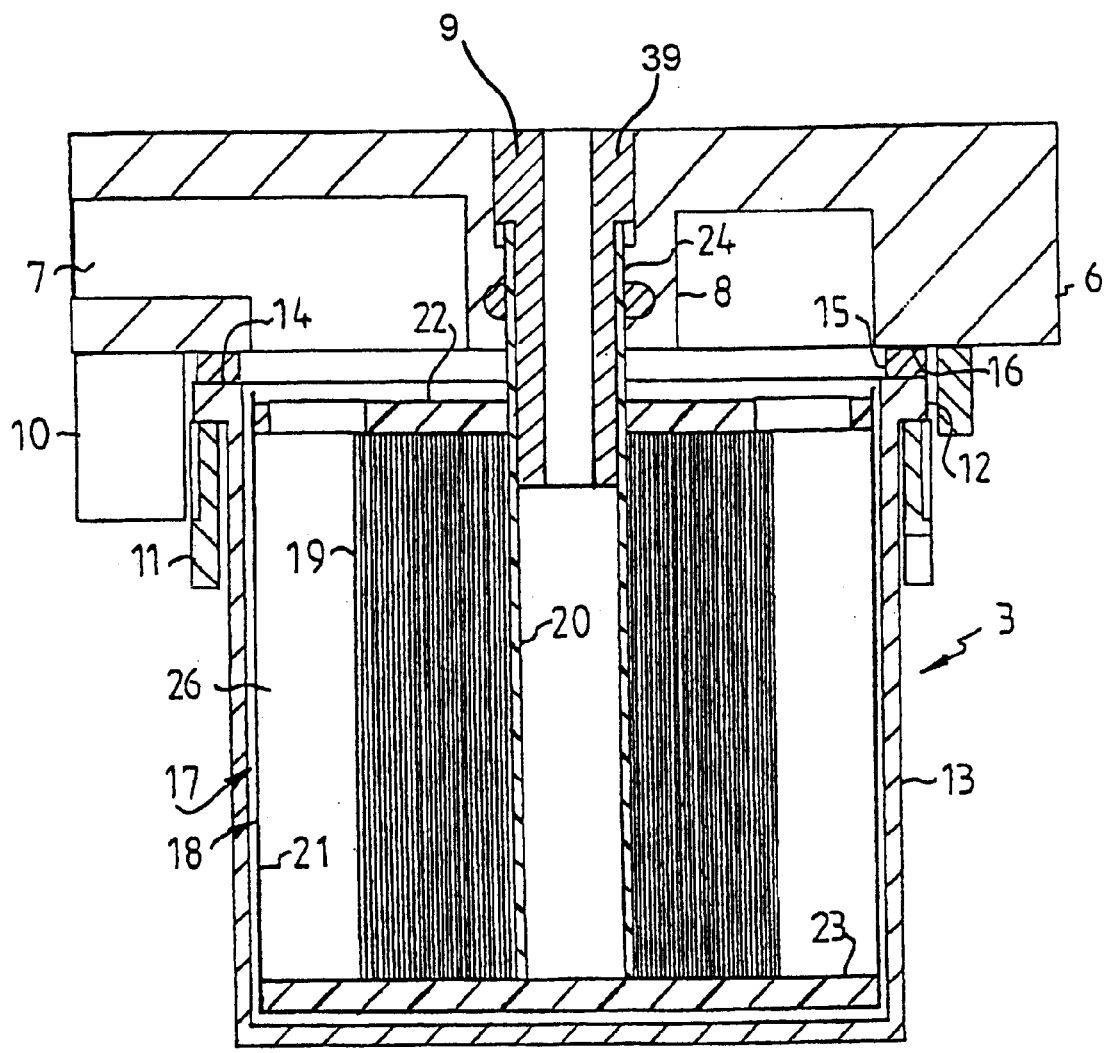
FIG. 2 shows a longitudinal section through a schematically represented filter holder with a filter.

In FIG. 1, 1 designates a fuel tank, from which fuel is pumped by a fuel pump 2 via a filter unit 3 to the fuel injection system 5 of an internal combustion engine 4. The filter unit 3, shown in more detail in FIG. 2, comprises a holder 6 connected to the engine 4. The holder has a fuel inlet 7 with a downwardly directed annular channel 8, arranged concentrically about the fuel outlet 9. The holder 6 has a downwardly directed, internally threaded annular flange 10, in which an externally threaded cap nut 11 is securely screwed. The nut 11 a buts against the lower side of a flange 12 on a container 13 of rigid material, e.g. sheet metal. An upper sealing surface 14 on the flange 12 abuts against a lower surface on a sealing ring 15, the upper surface of which abuts against a lower sealing surface on the holder 6.

A filter insert, generally designated 17, is held in the container 13. The insert 17 consists of an inner container 18, a filter element 19 and a perforated tube 20 joined to the filter element, all being glued to each other so as to form a unit. The inner container 18 is a relatively thin cylinder 21 of plastic or other suitable combustible material, and two end wall elements 22, 23 of plastic or other suitable combustible material. The upper end wall element 22 is made with peripherally evenly spaced openings facing the annular channel 8 in the holder 6. The perforated tube 20 has a non-perforated end portion 24, projecting above the end wall 22 and into the holder outlet 9.

To replace the filter insert 17, the outer container 13 is removed from the holder 6 by screwing out the nut 11 from the flange 12, whereafter the outer container 13 can be pulled out together with the insert. Dirty oil and other contaminants prevented from passing through the filter element 19, are collected in the intermediate space 26, and it is not possible that they will remain in the outer container 13 when the filter is replaced. The remounting of the outer container 13 with a new insert is just the reverse procedure, which means that both during disassembly and assembly, there will be no relative rotation between sealing surfaces in contact with each other, as is the case with a spin-on filter, for example.

Figure 3:
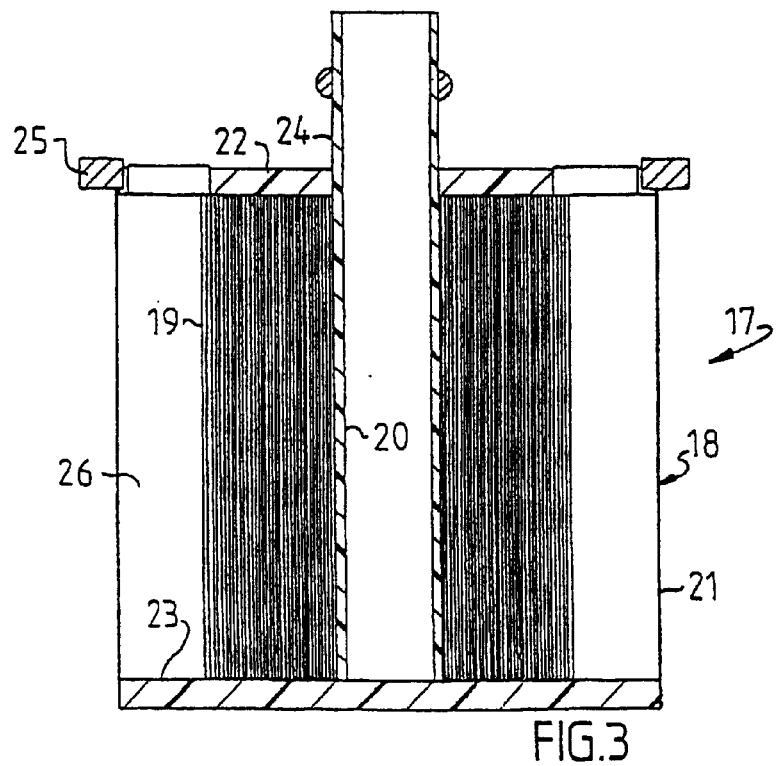
FIG. 3 shows a longitudinal section through a second embodiment of a filter insert.

A filter insert 17 shown in FIG. 3 differs from that described above in that it has a sealing ring 25 joined to the upper end wall element 22, to replace the loose sealing ring 15. In this way, it is assured that the sealing ring will also automatically be replaced when the filter insert is replaced.

As an alternative to the embodiment shown with a non-perforated tube portion 24 extending into the outlet 9 in the holder 6, the outlet in the holder 6 can be provided with a stub tube 39, projecting down into the perforated tube 20 somewhat below the upper end wall 22. When the outer container is removed and the stub tube is pulled out of the tube 20, the oil level will drop in the outer container, corresponding to the volume displaced by the stub tube. This reduces the risk of oil spilling over the edge of the outer container 13 when it is removed from the holder 6.

What is claimed is:

1. Liquid filter, comprising a holder element (6) with an inlet (7) and an outlet (9) for liquid, a first container (13) attachable to the holder element, and a filter body (19) housed in said first container, said body being so dimensioned relative to said container, that an intermediate space is formed between an inside of said first container and an outside of said filter body, and is so arranged relative to said holder element that the inlet opens into said intermediate space, while a space (20) inside the filter body opens into the outlet, characterized in that said filter body (19) is securely joined to a second container (18) arranged in the first container (13) and having, between its interior side and the outside of the filter body, an intermediate space (26), into which the holder element inlet (7) opens, the first container (13) consists of a more rigid material than the second container (18); and the second container (18) is a cylinder (21) having ends which are closed by end wallls (22,23), one of said end walls of which (22) is provided with peripherally spaced openings (23) lying facing an annular channel (8) in thee holder element, said channel communicating with the inlet (7).

2. Liquid filter according to claim 1, characterized in that the first container (13) is made of metal and the second container (18) is made of plastic.

3. Liquid filter according to claim 1, characterized in that the first container (13) is an upwardly open cylindrical metal shell, in which the second container (18) with associated filter body (19) can be inserted.

4. Liquid filter according to claim 3, characterized in that the filter body (19) is formed of a fibrous sheet, folded to form a cylindrical filter body about a perforated tube (20), an outer peripheral limit of the cylindrical filter body lying spaced from the interior side of the second container (18).

5. Liquid filter according to claim 4, characterized in that the outlet of the holder element has a stub tube receiving the perforated tube.

6. Liquid filter, comprising a holder element (6) with an inlet (7) and an outlet (9) for liquid, a first container (13) attachable to the holder element, and a filter body (19) housed in said first container, said body being so dimensioned relative to said container, that an intermediate space is formed between an inside of said first container and an outside of said filter body, and is so arranged relative to said holder element that the inlet opens into said intermediate space, while a space (20) inside the filter body opens into the outlet, characterized in that said filter body (19) is securely joined to a second container (18) arranged in the first container (13) and having, between its interior side and the outside of the filter body, an intermediate space (26), into which the holder element inlet (7) opens, in that the holder element (6) and the first container (13) have sealing surfaces (14, 16) facing each other, that a sealing ring (15) is laid between the sealing surfaces, and that the sealing surface (14) of the first container forms a topside of a flange (12) clamped between the sealing ring and a cap nut (11), which is screwed securely to a threaded flange (10) on the holder element.

7. Liquid filter according to claim 6, characterized in that the first container (13) consists of a more rigid material than the second container (18).

8. Liquid filter according to claim 6, characterized in that the first container (13) is an upwardly open cylindrical metal shell, it which the second container (18) with associated filter body (19) can be inserted.

9. Liquid filter according to claim 8, characterized in that the second container (18) is a plastic cylinder (21) having ends of which are closed by end walls (22,23), one of said end walls of which (22) is provided with peripherally spaced openings (23) lying facing an annular channel (8) in the holder element, said channel communicating with the inlet (7).

10. Liquid filter according to claim 9, characterized in that said sealing ring is an annular seal (25) is fixed to an outer edged of the end wall (22) with peripheral openings (23), said seal being clamped between the sealing surface of the holder element and the cap nut, which is screwed securely to the threaded flange on the holder element.

11. Liquid filter according to claim 8, characterized in that the filter body (19) is formed of a fibrous sheet, folded to form a cylindrical filter body about a perforated tube (20), an outer peripheral limit of the cylindrical filter body lying spaced from the interior side of the second container (18).

12. Liquid filter according to claim 11, characterized in that the second container (18) is a plastic cylinder (21) having ends of which are closed by end walls (22,23), one of said end walls of which (22) is provided with peripherally spaced openings (23) lying facing an annular channel (8) in the holder element, said channel communicating with the inlet (7).

13. Liquid filter according to claim 6, characterized in that the first container (13) is made of metal and the second container (18) is made of plastic.

14. Liquid filter, comprising a holder element (6) with an inlet (7) and an outlet (9) for liquid, a first container (13) attachable to the holder element, and a filter body (19) housed in said first container, said body being so dimensioned relative to said container, that an intermediate space is formed between an inside of said first container and an outside of said filter body, and is so arranged relative to said holder element that the inlet opens into said intermediate space, while a space (20) inside the filter body opens into the outlet, characterized in that said filter body (19) is securely joined to a second container (18) arranged in the first container (13) and having, between its interior side and the outside of the filter body, an intermediate space (26), into which the holder element inlet (7) opens, in that the filter body (19) is formed of a fibrous sheet, folded to form a cylindrical filter body about a perforated tube (20), an outer peripheral limit of the cylinder lying spaced from the interior side of the second container (18), and in that the perforated tube (20) has a non-perforated extension (24) extending through an end wall (22) with peripherally spaced openings of the second container and into an opening of the outlet (9) in the holder element.

15. Liquid filter according to claim 14, characterized in that the first container (13) consists of a more rigid material than the second container (18).

16. Liquid filter according to claim 14, characterized in that the first container (13) is made of metal and the second container (18) is made of plastic.

17. Liquid filter according to claim 16, characterized in that the holder element (6) and the first container (13) have sealing surfaces (14,16) facing each other, that a sealing ring (15) is laid between the sealing surfaces, and that the sealing surface (14) of the first container forms a topside of a flange (12) clamped between the sealing ring and a cap nut (11), which is screwed securely to a threaded flange (10) on the holder element.

18. Liquid filter according to claim 14, characterized in that the first container (13) is an upwardly open cylindrical metal shell, in which the second container (18) with associated filter body (19) can be inserted.

19. Liquid filter according to claim 18, characterized in that the second container (18) is a plastic cylinder (21), the ends of which are closed by end walls (22,23), one of which (22) is provided with peripherally spaced openings (23) lying facing an annular channel (8) in the holder element, said channel communicating with the inlet (7).

20. Liquid filter according to claim 19, characterized in that an annular seal (25) is fixed to an outer edge of the end wall (22) with peripheral openings (23), said seal being clamped between a sealing surface of the holder element and a cap nut, which is screwed securely to a threaded flange on the holder element.

* * * * *